(12) United States Patent
Barada

(10) Patent No.: US 6,984,907 B2
(45) Date of Patent: Jan. 10, 2006

(54) MAGNETIC BEARING APPARATUS

(75) Inventor: Toshimitsu Barada, Tokyo (JP)

(73) Assignee: Ebara Corporation, Tokyo (JP)

( * ) Notice: Subject to any disclaimer, the term of this patent is extended or adjusted under 35 U.S.C. 154(b) by 17 days.

(21) Appl. No.: 10/874,229

(22) Filed: Jun. 24, 2004

(65) Prior Publication Data
US 2004/0263011 A1 Dec. 30, 2004

(30) Foreign Application Priority Data
Jun. 25, 2003 (JP) ............................ 2003-180782
May 19, 2004 (JP) ............................ 2004-149604

(51) Int. Cl.
*H02K 7/09* (2006.01)
(52) U.S. Cl. .................................... 310/90.5
(58) Field of Classification Search ............... 310/90.5, 310/51; 318/606–608
See application file for complete search history.

(56) References Cited

U.S. PATENT DOCUMENTS 4,686,404 A * 8/1987 Nakazeki et al. .......... 310/90.5
6,657,345 B2 * 12/2003 Shinozaki .................. 310/90.5
2003/0038552 A1 * 2/2003 Setiawan et al. .......... 310/90.5

FOREIGN PATENT DOCUMENTS

| JP | 5-332360 | 12/1993 |
| JP | 6-58332 | 3/1994 |
| JP | 2000-145774 | 5/2000 |

* cited by examiner

*Primary Examiner*—Thanh Lam
(74) *Attorney, Agent, or Firm*—Wenderoth, Lind & Ponack, L.L.P.

(57) ABSTRACT

A magnetic bearing apparatus has an electromagnet having a coil for levitating a rotatable member by a magnetic force and a control device to adjust a gain for levitation control of the rotatable member. The control device includes a displacement sensor to detect a levitated position of the rotatable member, a driver to supply a current to the electromagnet, and a phase compensator to adjust the current based on a signal from the displacement sensor. The control device also includes a band-pass filter into which an output signal of the phase compensator is inputted, an amplifier to amplify an output signal of the band-pass filter at a predetermined amplification ratio, and an adder to add an output signal of the amplifier to an output signal of the phase compensator and supply an added signal to the driver. The band-pass filter has a center frequency based on an actual rotation frequency of the rotatable member, a voltage, a current, or a frequency of a power source for a motor.

24 Claims, 11 Drawing Sheets

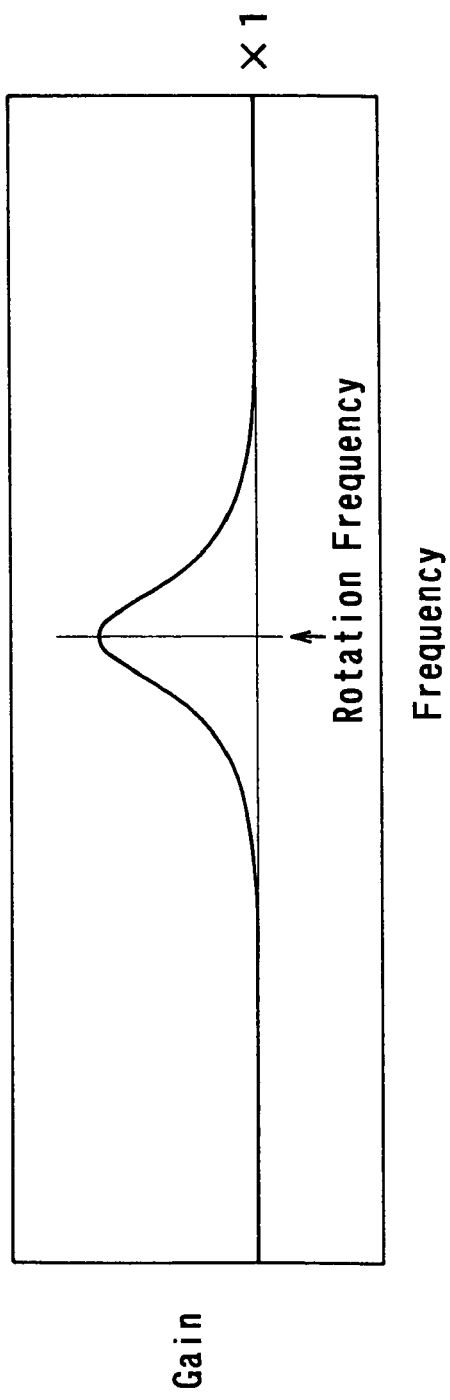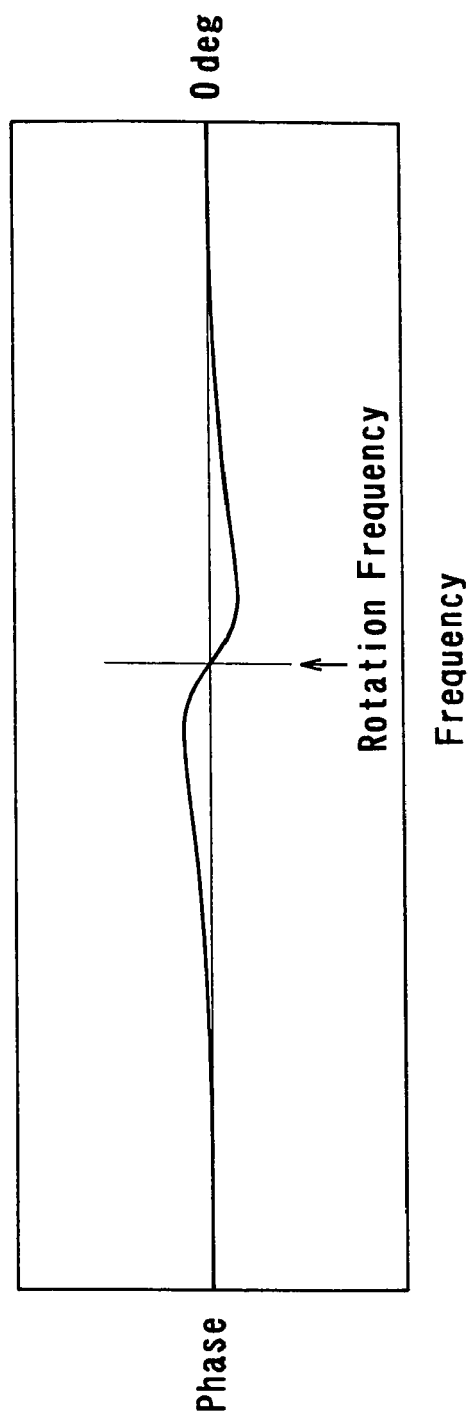
FIG. 5A
FIG. 5B

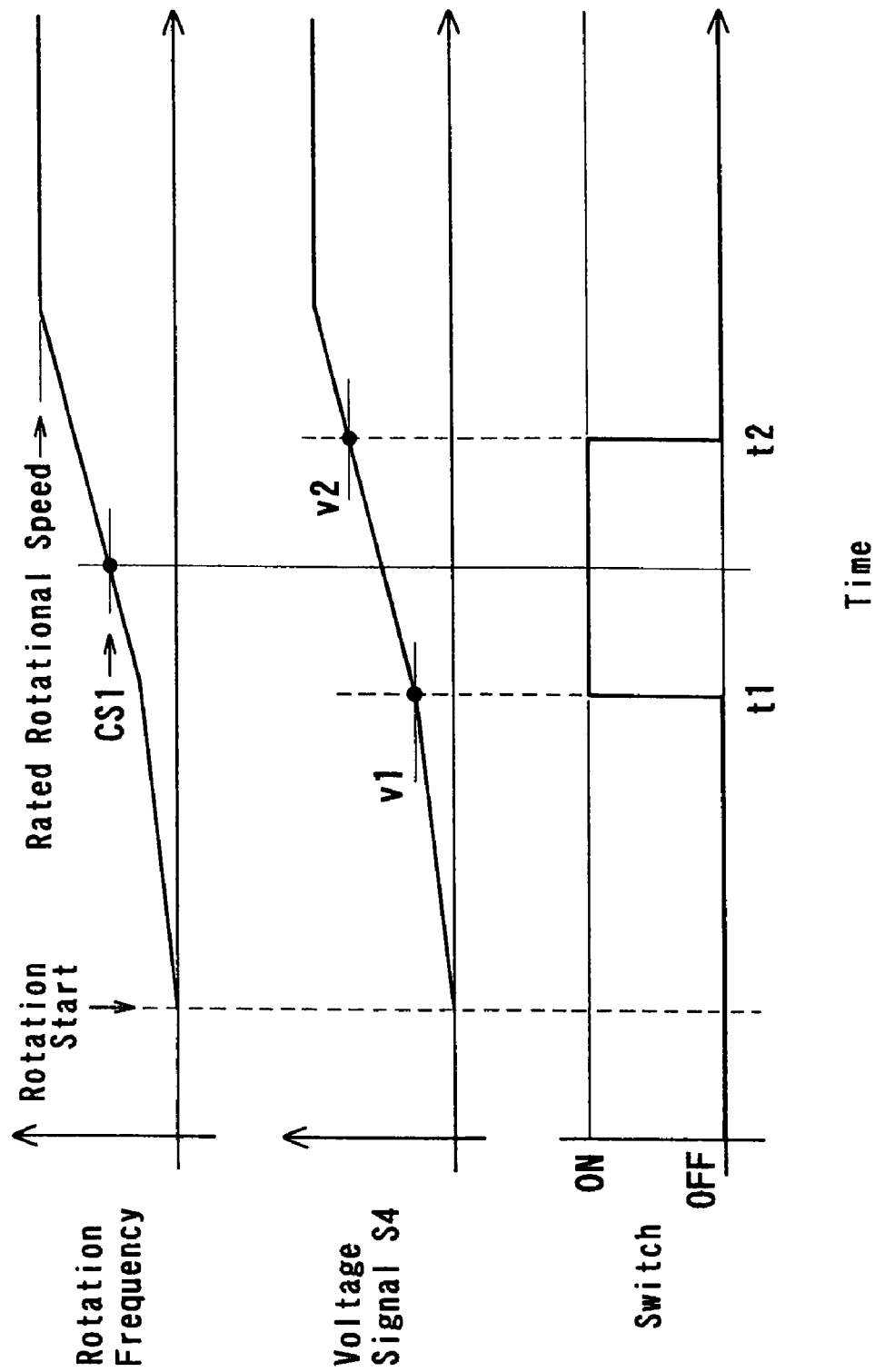

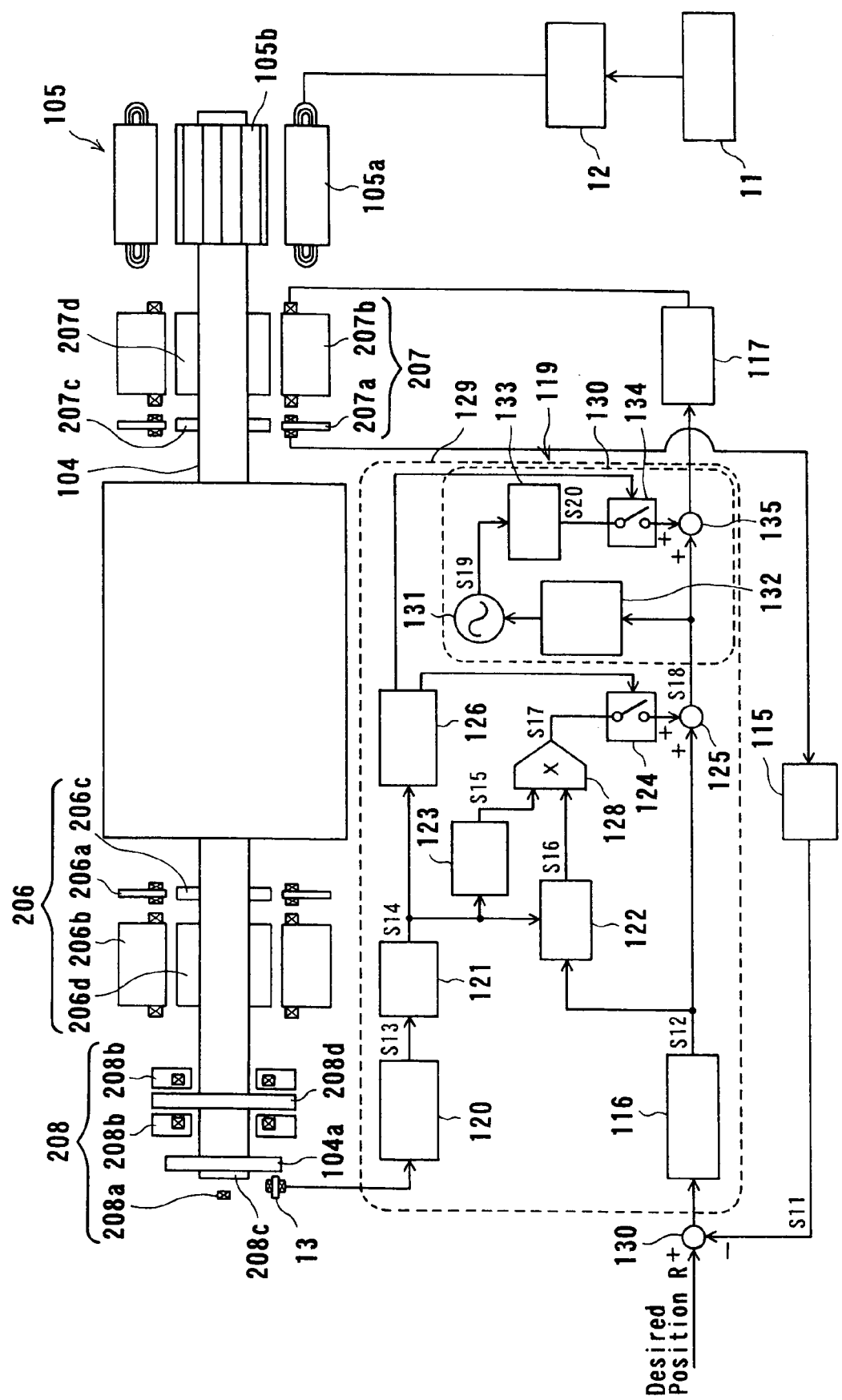

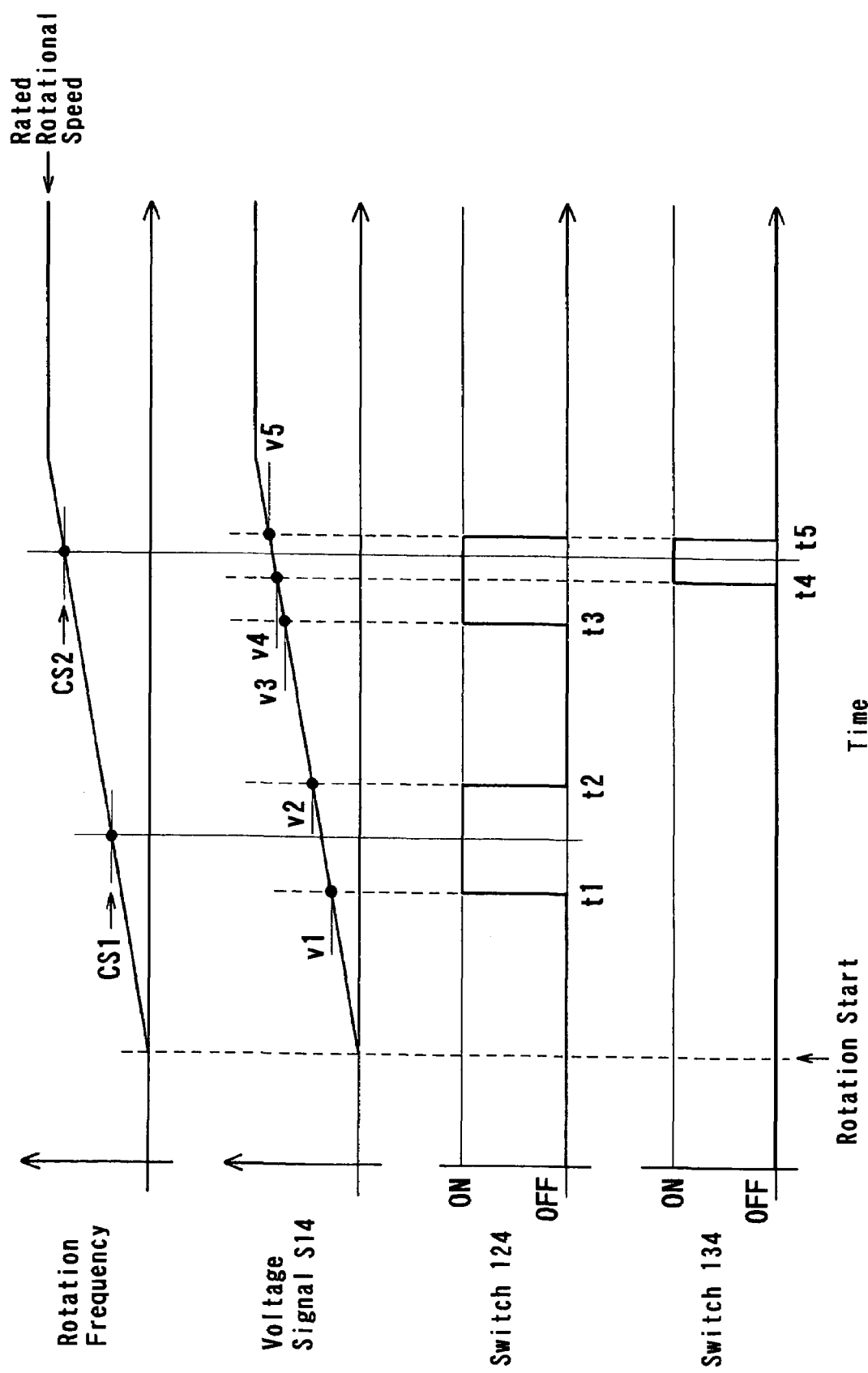

MAGNETIC BEARING APPARATUS

BACKGROUND OF THE INVENTION

1. Field of the Invention

The present invention relates to a controlled magnetic bearing apparatus for supporting a rotatable member in a levitated state by a magnetic force, and more particularly to a magnetic bearing apparatus which can effectively maintain stiffness of a magnetic bearing. The present invention also relates to a fluid machine having such a magnetic bearing apparatus and a motor for rotating a rotatable member.

2. Description of the Related Art

Magnetic bearing devices have heretofore been widely employed in a fluid machine having a rotatable member to be rotated at high speeds because magnetic bearing devices allow the rotatable member to be supported in a non-contact manner by a magnetic force. Such a magnetic bearing device has the following advantages. It is possible to reduce a rotational resistance of the rotatable member supported by bearings. No particles are produced by abrasion of bearings. Maintenance of bearings by abrasion is not required. There is no contamination caused by a lubricant for bearings.

For example, a gas laser apparatus 500 shown in FIG. 1 has a laser container 501 containing a laser gas therein and a circulating fan 503 disposed within the laser container 501. The laser gas includes a halogen gas such as a fluorine gas. The circulating fan 503 has a rotatable shaft 504, which projects outward from both ends of the laser container 501. The rotatable shaft 504 is supported by magnetic bearing devices and rotated by a motor 505. Specifically, the rotatable shaft 504 is rotatably supported in a non-contact manner away from the laser container 501 by radial magnetic bearing devices 506 and 507 provided at both ends of the laser container 501 and an axial magnetic bearing device 508 provided at one end of the laser container 501.

Each of the magnetic bearing devices 506, 507, and 508 generally has the same structure, which includes a magnetic target provided on the rotatable shaft 504 and an electromagnet provided on the laser container 501 at a position facing the magnetic target so as to levitate and support the rotatable shaft 504 in a non-contact manner away from the laser container 501 by a magnetic force of the electromagnet. Thus, only the radial magnetic bearing device 507 will be described below.

The radial magnetic bearing apparatus 507 has a displacement sensor 507a, an electromagnet 507b, a displacement sensor target 507c, and an electromagnet target 507d made of a magnetic material. The displacement sensor 507a and the electromagnet 507b are provided on the laser container 501, and the displacement sensor target 507c and the electromagnet target 507d are provided on the rotatable shaft 504 of the circulating fan 503. Thus, the rotatable shaft 504 is supported in a non-contact manner away from the laser container 501 by a magnetic attractive force of the electromagnet 507b.

The radial magnetic bearing device 507 includes a control device. The control device includes a displacement detector for detecting a relative position of the rotatable shaft 504 based on a signal from the displacement sensor 507a, which detects the displacement sensor target 507c, a phase compensator for calculating and outputting a bearing control signal according to a deviation between the detected position of the rotatable shaft 504 and a reference position so as to stably position the rotatable shaft 504 at a predetermined location, and a driver for amplifying and supplying the bearing control signal as an exciting current to the electromagnet 507b. The control device allows the rotatable shaft 504 of the circulating fan 503 to be positioned at a predetermined location and to thus be rotated stably by the motor 505.

Various efforts have been made in controlling operations of fluid machines having such magnetic bearing devices in order to stably support a rotatable member rotated at a high speed in a non-contact manner.

However, in a fluid machine having conventional magnetic bearing devices, when the rotatable shaft 504 is rotated by the motor 505 in the gas laser apparatus 500, an unbalanced radial magnetic pull is produced so as to lower an open-loop gain of the magnetic bearings. Accordingly, the stiffness of the magnetic bearings is adversely lowered.

FIG. 2 is a graph showing characteristics of the magnetic bearing stiffness of a conventional magnetic bearing device. In FIG. 2, the stiffness of the radial magnetic bearing 507 with a driving force of the motor 505 is compared to that without a driving force of the motor 505. As shown in FIG. 2, the stiffness of the radial magnetic bearing 507 is lowered by an unbalanced radial magnetic pull of the motor 505 produced when the motor 505 is driven. Particularly, the stiffness of the radial magnetic bearing 507 is lowered near a critical speed in a rigid mode of the rotatable shaft 504 (see X in FIG. 2). If the stiffness of a magnetic bearing is lowered near a specific frequency, then the rotatable shaft 504 excessively whirls within a range including the specific frequency. Thus, the rotatable shaft 504 cannot be rotated stably. This tendency becomes more significant as an output of the motor 505 is increased.

The above problems cannot be solved by the following conventional methods of controlling a magnetic bearing. For example, a band-pass filter is used to prevent unbalance of a rotatable member when the rotatable member is rotated at a high speed and to enhance the stiffness of a magnetic bearing when the rotatable member is rotated at a low speed. In this case, although a gain for levitation control may be adjusted near a rotation frequency of the rotatable member so as to be lower than a gain at other frequencies, it cannot be adjusted so as to be higher than a gain at other frequencies. Accordingly, this method is not effective in passing a critical speed in a rigid mode within a low-frequency range, in which the rotatable member is not rotated about the center of inertia. Further, such a control requires complicated circuits.

Further, there has been developed a method for improving the bearing stiffness at a slip frequency of an induction motor. However, such a method is not effective in improving the bearing stiffness near a critical speed of a rotatable member. There has also been developed a method of detecting a current supplied to a motor and enhancing the bearing stiffness when the detected current is larger than a reference value. However, such a method cannot control a gain for levitation control near a specific frequency at which the bearing stiffness is lowered.

The following methods have been proposed to solve the above drawbacks. An open-loop gain to be lowered due to an unbalanced radial magnetic pull caused by a motor is added to a proportional gain for levitation control in advance. Alternatively, a proportional gain for levitation control is increased according to load conditions of a motor. However, these methods lose the control stability at higher-order frequencies in a flexible mode. Thus, it is difficult to put these methods into practice.

Further, when the rotatable shaft 504 is rotated, a critical speed diverges into a critical speed at a lower frequency and a critical speed at a higher frequency due to gyroscopic effects. As the rotation frequency of the rotatable shaft 504 is higher, a difference between a backward whirl frequency on a lower side and a forward whirl frequency on a higher side becomes larger. When the rotatable shaft 504 is not rotated, the magnetic bearing can be controlled stably. However, when the rotatable shaft 504 is rotated, critical speeds vary according to the rotation frequency of the rotatable shaft 504. Particularly, the control of the bearing is likely to be unstable at a forward whirl frequency and a backward whirl frequency, which correspond to critical speeds in a flexible mode of the rotatable shaft 504. If a proportional gain is lowered in order to maintain the stability of the magnetic bearing, then the bearing stiffness is lowered in a low-frequency range to thereby cause an excessive whirl of the rotatable shaft 504. Thus, the control stability of the magnetic bearing cannot be achieved at both of lower rotation frequencies and higher rotation frequencies.

Further, sufficient bearing stiffness cannot be maintained near a critical speed in a flexible mode. Accordingly, in order to rotate the rotatable shaft 504 at frequencies higher than the critical speed in the flexible mode, accurate balancing, which has not been practical, is required. Although there has been proposed to lower a control gain at the critical speed in the flexible mode so as to stably support a rotatable member, it is difficult to rotate the rotatable member at frequencies higher than the critical speed in the flexible mode.

SUMMARY OF THE INVENTION

The present invention has been made in view of the above drawbacks. It is, therefore, a first object of the present invention to provide a magnetic bearing apparatus which can effectively maintain stiffness of a magnetic bearing at rotation frequencies ranging from a low frequency to a high frequency.

A second object of the present invention is to provide a fluid machine having such a magnetic bearing apparatus.

According to a first aspect of the present invention, there is provided a magnetic bearing apparatus having an electromagnet including a coil for levitating a rotatable member to support the rotatable member in a levitated state by a magnetic force and a control device configured to adjust a gain for levitation control of the rotatable member. The control device includes a displacement sensor operable to detect a levitated position of the rotatable member, a driver operable to supply an exciting current to the electromagnet, and a phase compensator operable to adjust the exciting current to be supplied to the electromagnet based on a signal from the displacement sensor. The control device also includes a band-pass filter into which an output signal of the phase compensator is inputted, an amplifier operable to amplify an output signal of the band-pass filter at a predetermined amplification ratio, and an adder operable to add an output signal of the amplifier to an output signal of the phase compensator and supply an added signal to the driver. The band-pass filter has a center frequency based on at least one of an actual rotation frequency of the rotatable member, a voltage, a current, and a frequency of a power source to supply electric power to a motor for rotating the rotatable member.

According to the present invention, a gain for levitation control of a magnetic bearing can be adjusted at any frequencies to support a rotatable member in a levitated state based on an actual rotation frequency of the rotatable member, a voltage, a current, and a frequency of a power source to supply electric power to a motor for rotating the rotatable member. Accordingly, a gain for levitation control can be changed based on driving conditions of the motor or the rotation frequency of the rotatable member. Thus, an open-loop gain can be optimized according to operating conditions.

Specifically, when no driving force is applied to the rotatable member, an open-loop gain can be set as a gain for levitation control so as to be sufficient to levitate the rotatable member, thereby enhancing the control stability. When a driving force is applied to the rotatable member, for example, the center frequency of the band-pass filter is set so as to be conformed to the rotation frequency of the rotatable member, thereby increasing a gain for levitation control only near the rotation frequency of the rotatable member.

Thus, when an open-loop gain is lowered by an unbalanced radial magnetic pull of the motor, unbalanced vibration of the rotatable member can effectively be suppressed in a frequency range in which the rotatable member is not rotated about the center of inertia. The stability of the control system for the magnetic bearing is not inhibited while a gain for levitation control is not increased in a higher-order frequency range in a flexible mode excluding the rotation frequency of the rotatable member.

It is difficult to achieve the stability of the magnetic bearing at both of low frequencies and high frequencies. Nevertheless, the stability of the magnetic bearing can be maintained at low frequencies by a conventional phase compensator. Even if the rotation frequency is varied at high frequencies, the center frequency of the band-pass filter is set to be near a forward whirl frequency or a backward whirl frequency so as to follow the variations of the rotational speed of the rotatable member. Thus, a gain for levitation control of the magnetic bearing can be increased only near the center frequency of the band-pass filter so as to maintain the stability of the magnetic bearing. For example, when the center frequency of the band-pass filter is set to be near a frequency at which the rotation frequency of the rotatable member is conformed to a critical speed in a flexible mode, a gain for levitation control of the magnetic bearing can be increased only near that frequency. Thus, it is possible to provide high bearing stiffness sufficient to suppress unbalanced vibration even if the rotation frequency of the rotatable member is confirmed to the critical speed of the flexible mode. Accordingly, the rotatable member can be rotated at rotational speeds higher than the critical speed in the flexible mode without accurate balancing.

The control device may adjust an amplification ratio of the amplifier based on at least one of the actual rotation frequency of the rotatable member, the voltage, the current, and the frequency of the power source. For example, when an unbalanced radial magnetic pull of the motor is applied to the magnetic bearing, a gain for levitation control of the rotatable member can be adjusted so as to be sufficient to suppress unbalanced vibration of the rotatable member at each rotation frequency. Specifically, a gain for levitation control can be minimized according to an unbalanced radial magnetic pull, which varies depending upon driving loads on the rotatable member. Thus, the control stability can be maintained at higher-order frequencies in a flexible mode of the rotatable member.

Even if the center frequency of the band-pass filter is set near the critical speed in the flexible mode of the rotatable member, a gain for levitation control can be adjusted so as to be sufficient to maintain the stability according to a resonance level of the critical speed in the flexible mode of the rotatable member.

The control device may further include a switch operable to switch adjustment of the gain for levitation control of the rotatable member based on at least one of the actual rotation frequency of the rotatable member, the voltage, the current, and the frequency of the power source. The control device may further include a switch controller operable to switch on the switch based on at least one of the actual rotation frequency of the rotatable member, the voltage, the current, and the frequency of the power source when the rotation frequency of the rotatable member is within a range near a frequency corresponding to a critical speed of the rotatable member. Thus, an on-off control of the adjustment of the gain for levitation control can be achieved. Specifically, the switch is switched off in a rotation frequency range in which a gain for levitation control is not required to be adjusted, or in a range in which the magnetic bearing would be unstable due to adjustment of the gain for levitation control, e.g. in a higher-order frequency range in a flexible mode of the rotatable member. The switch is turned on in a rotation frequency range in which a gain for levitation control is required to be adjusted, to thereby perform a feedback control (adjustment).

According to a second aspect of the present invention, there is provided a magnetic bearing apparatus having an electromagnet including a coil for levitating a rotatable member to support the rotatable member in a levitated state by a magnetic force and a control device configured to adjust a gain for levitation control of the rotatable member. The control device includes a displacement sensor operable to detect a levitated position of the rotatable member, a driver operable to supply an exciting current to the electromagnet, and a phase compensator operable to adjust the exciting current to be supplied to the electromagnet based on a signal from the displacement sensor. The control device also includes a band-pass filter into which an output signal of the phase compensator is inputted, a first amplifier operable to amplify an output signal of the band-pass filter at a predetermined amplification ratio, and an adder-subtracter operable to add an output signal of the first amplifier to an output signal of the phase compensator or subtract an output signal of the first amplifier from an output signal of the phase compensator. The control device has a feedforward circuit operable to add a feedforward signal to an output signal of the adder-subtracter and supply an added signal to the driver when the amplification ratio of the first amplifier is large.

The feedforward circuit may includes an oscillator operable to generate a signal having a desired frequency, a tuner operable to conform a frequency and a phase of an output signal of the oscillator to a frequency and a phase of the output signal of the adder-subtracter, and a second amplifier operable to amplify an output signal of the oscillator at a predetermined amplification ratio.

With the above arrangement, since an unbalanced force of the rotatable member is cancelled by a feedforward signal, unbalanced vibration can effectively be suppressed. With the feedforward circuit, it is possible to maintain high bearing stiffness without limitation of the amplification ratio of the first amplifier.

The control device may adjust an amplification ratio of the first amplifier based on at least one of an actual rotation frequency of the rotatable member, a voltage, a current, and a frequency of a power source to supply electric power to a motor for rotating the rotatable member. For example, even when an unbalanced radial magnetic pull of the motor is applied to the magnetic bearing, a gain for levitation control of the rotatable member can be adjusted so as to sufficient to suppress unbalanced vibration at each frequency, thereby maintaining the control stability at higher-order frequencies in a flexible mode of the rotatable member.

The control device may further include a first switch operable to switch adjustment of the gain for levitation control based on at least one of an actual rotation frequency of the rotatable member, a voltage, a current, and a frequency of a power source to supply electric power to a motor for rotating the rotatable member. The control device may further include a switch controller operable to switch on the first switch based on at least one of the actual rotation frequency of the rotatable member, the voltage, the current, and the frequency of the power source when the rotation frequency of the rotatable member is within a range near a frequency corresponding to a critical speed of the rotatable member.

Thus, an on-off control of the adjustment of the gain for levitation control can be achieved. Specifically, the first switch is switched off in a rotation frequency range in which a gain for levitation control is not required to be adjusted, or in a range in which the magnetic bearing would be unstable due to adjustment of the gain for levitation control, e.g. in a higher-order frequency range in a flexible mode. The first switch is switched on in a rotation frequency range in which a gain for levitation control is required to be adjusted.

The feedforward circuit may adjust an amplification ratio of the second amplifier based on at least one of an actual rotation frequency of the rotatable member, a voltage, a current, and a frequency of a power source to supply electric power to a motor for rotating the rotatable member. Thus, an amplification ratio of the second amplifier can be adjusted at any frequencies. For example, an amplification ratio of the second amplifier can be adjusted so that unbalanced vibration of the rotatable member is within a tolerance. Accordingly, it is possible to maintain the minimum bearing stiffness to reduce electricity consumption.

The feedforward circuit may further include a second switch operable to switch adjustment of the gain for levitation control in the feedforward circuit based on at least one of an actual rotation frequency of the rotatable member, a voltage, a current, and a frequency of a power source to supply electric power to a motor for rotating the rotatable member. Since the second switch can perform an on-off control of an output signal of the second amplifier, it is possible to switch on and off a feedforward control by the feedforward circuit. For example, the feedforward control is switched off at frequencies at which the output signal of the band-pass filter is not so amplified. The feedforward control is switched on at frequencies at which the output signal of the band-pass filter is so amplified that the feedforward control is effective.

The control device may further include a switch controller operable to switch on the second switch based on at least one of the actual rotation frequency of the rotatable member, the voltage, the current, and the frequency of the power source when the rotation frequency of the rotatable member is within a range near a frequency corresponding to a critical speed of the rotatable member.

According to a third aspect of the present invention, there is provided a fluid machine having a rotatable member, a motor operable to rotate the rotatable member, and the aforementioned magnetic bearing apparatus. The magnetic bearing apparatus according to the present invention is applicable not only to a fluid machine, but also to various rotating machines. When the magnetic bearing apparatus according to the present invention is applied to a rotating machine which is required to have high power, the magnetic bearing allows a rotatable member to be stably supported and rotated at a high speed.

According to the present invention, even if an unbalanced radial magnetic pull is produced by rotation of the rotatable member, the stiffness of the magnetic bearing can effectively be maintained near the rotation frequency of the rotatable member. Accordingly, the bearing stiffness of the magnetic bearing apparatus can effectively be maintained so as to stably operate a fluid machine.

Further, even if a critical speed diverges into a forward whirl frequency and a backward whirl frequency due to gyroscopic effects, the control stability of the magnetic bearing can be achieved at both of low rotation frequencies and high frequencies. Further, the rotatable member can be rotated at rotational speeds higher than a critical speed in a flexible mode without accurate balancing. Accordingly, the bearing stiffness of the magnetic bearing apparatus can effectively be maintained so as to stably operate the fluid machine.

The above and other objects, features, and advantages of the present invention will be apparent from the following description when taken in conjunction with the accompanying drawings which illustrate preferred embodiments of the present invention by way of example.

BRIEF DESCRIPTION OF THE DRAWINGS

FIGS. 5A and 5B are graphs showing frequency transfer characteristics of the magnetic bearing apparatus shown in FIG. 4;

FIG. 6 is a time chart showing an example of operation of a control device shown in FIG. 4;

FIG. 8 is a block diagram of a control system of a fluid machine having magnetic bearing apparatuses according to a second embodiment of the present invention;

FIG. 10 is a time chart showing an example of operation of a control device shown in FIG. 8.

DETAILED DESCRIPTION OF THE PREFERRED EMBODIMENTS

A fluid machine having magnetic bearing apparatuses according to embodiments of the present invention will be described below with reference to FIGS. 3 through 11. The disclosure of Japanese patent application No. 2003-180782 filed Jun. 25, 2003 and Japanese patent application No. 2004-149604 filed May 19, 2004 including specifications, drawings, and claims is incorporated herein by reference in its entirety.

Figure 1:
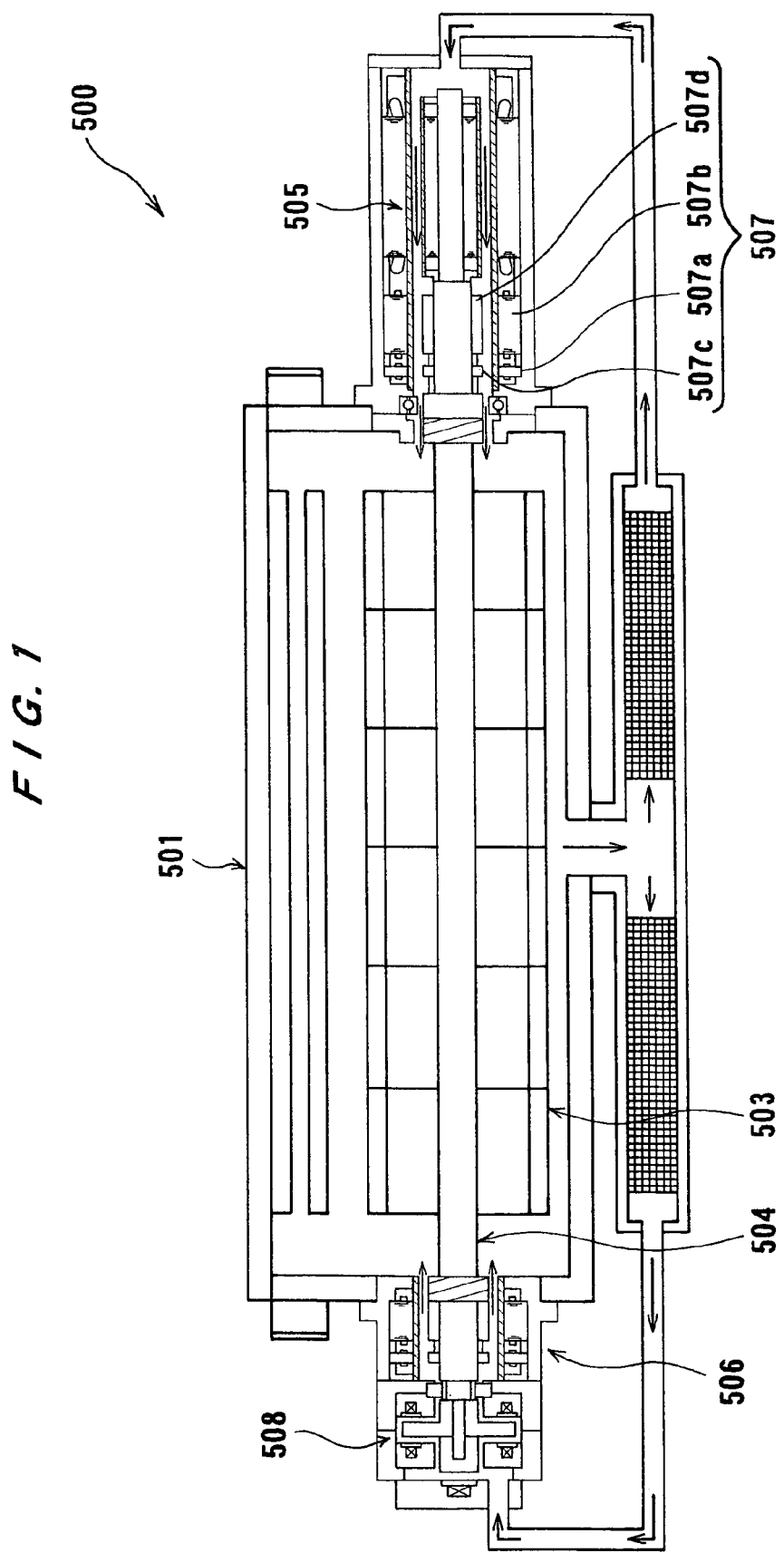
FIG. 1 is a schematic view showing a fluid machine using magnetic bearing devices.
Figure 2:
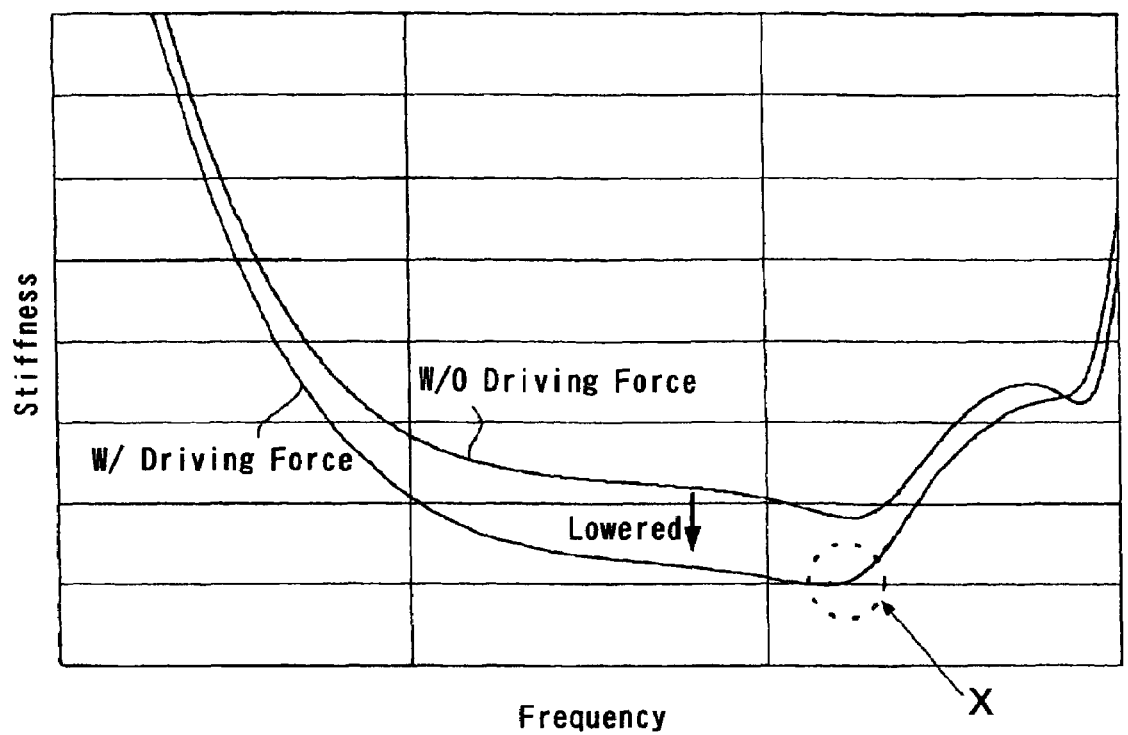
FIG. 2 is a graph showing characteristics of magnetic bearing stiffness of a magnetic bearing device.
Figure 3:
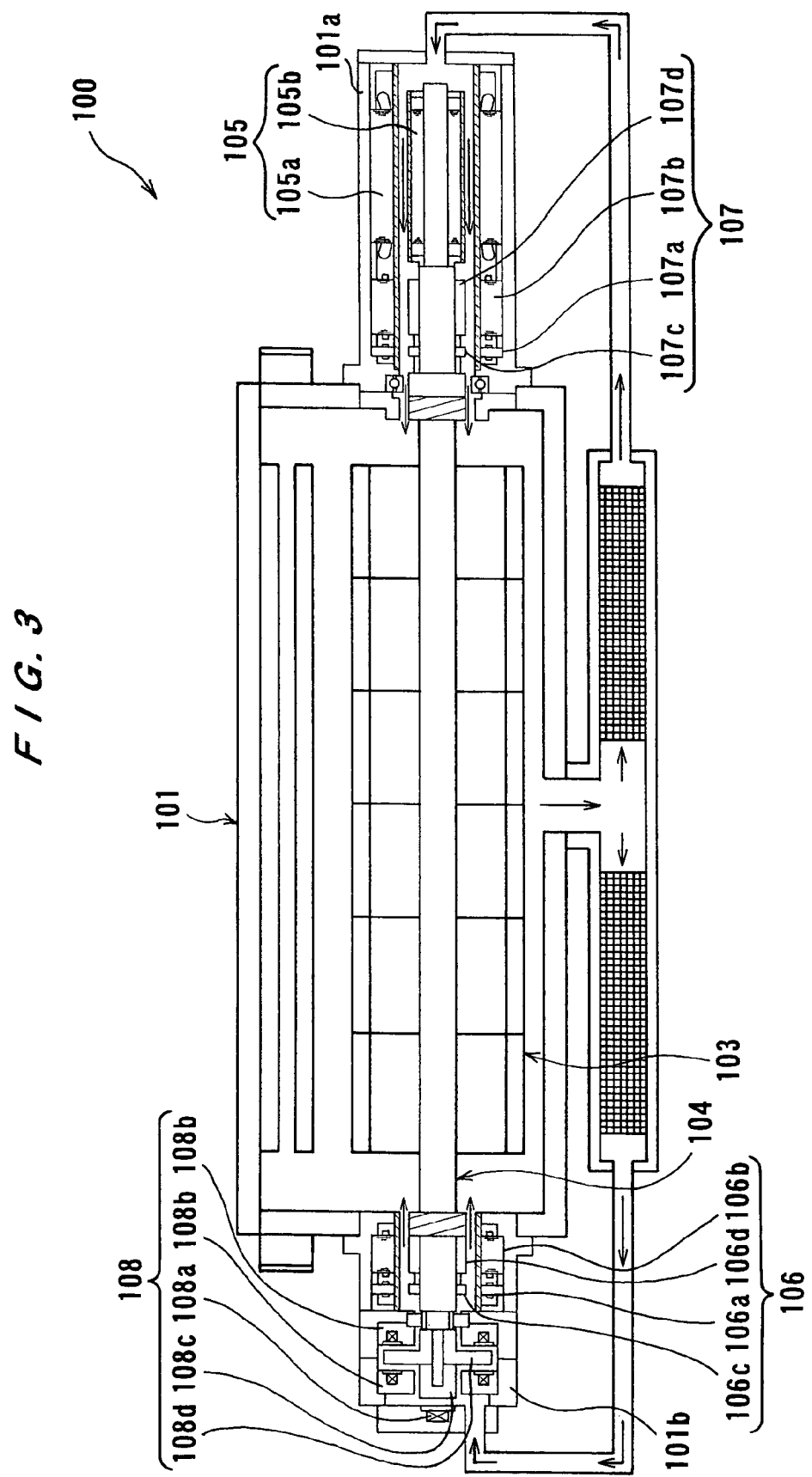
FIG. 3 is a schematic view showing a fluid machine having magnetic bearing apparatuses according to a first embodiment of the present invention.
Figure 4:
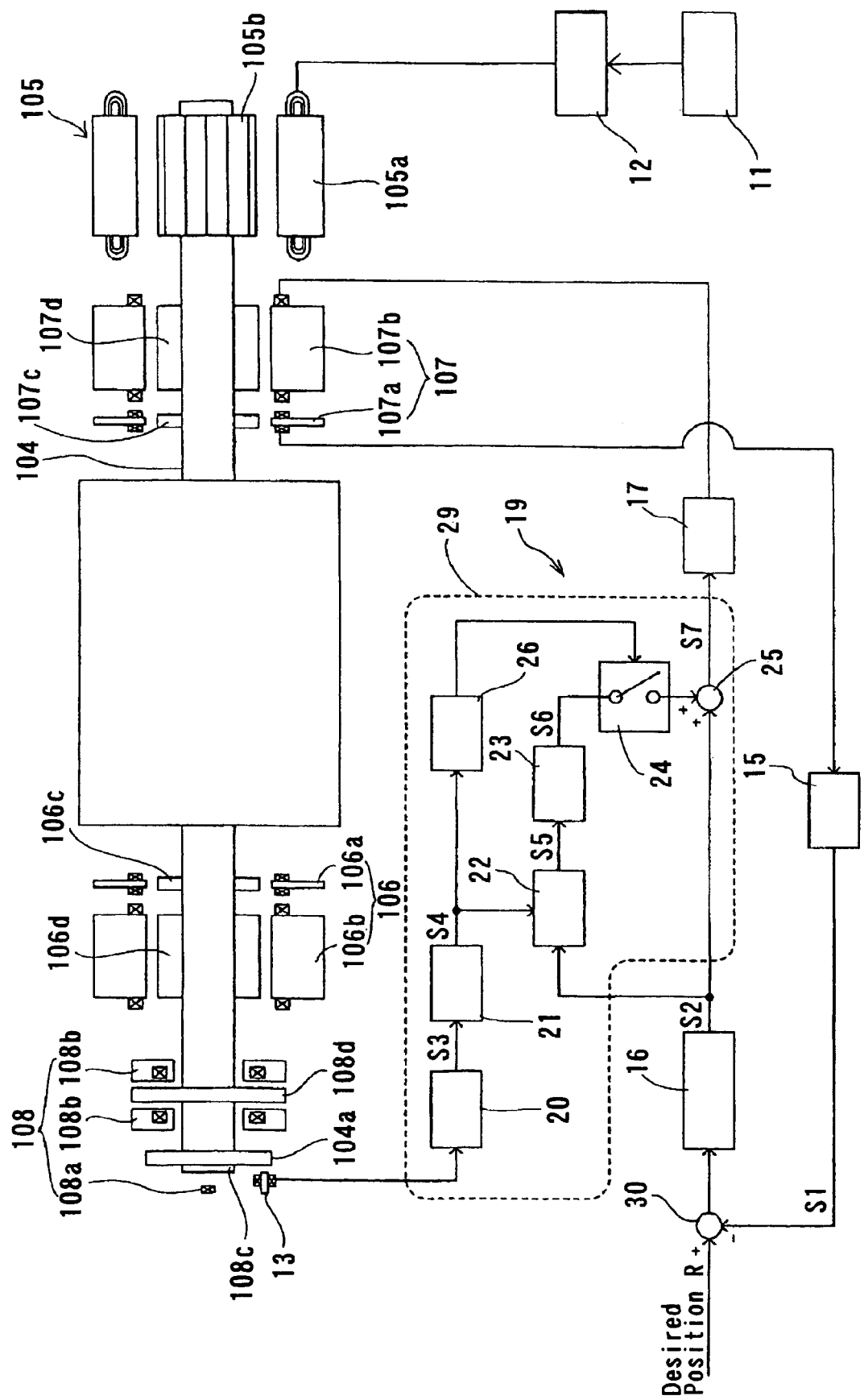
FIG. 4 is a block diagram of a control system of the fluid machine shown in FIG. 3.

FIG. 3 is a schematic view showing a gas laser apparatus 100 as a fluid machine having magnetic bearing apparatuses according to a first embodiment of the present invention. FIG. 4 is a block diagram of a control system of the gas laser apparatus 100. As shown in FIGS. 3 and 4, the gas laser apparatus 100 has a laser container 101, which includes a laser gas therein under pressure in a hermetically sealed manner, and a circulating fan 103 disposed within the laser container 101 for circulating the laser gas. The laser gas includes a halogen gas such as a fluorine gas.

The laser container 101 has cylindrical portions 101a and 101b provided at both ends of the laser container 101. The circulating fan 103 includes a rotatable shaft 104 having ends projecting into the cylindrical portions 101a and 101b. The rotatable shaft 104 is rotatably supported in the cylindrical portions 101a and 101b and rotated by a motor 105 disposed at an end of the rotatable shaft 104.

The motor 105 includes a motor stator 105a provided on an inner surface of the stationary cylindrical portion 101a of the laser container 101, and a motor rotor 105b provided on an outer surface of the rotatable shaft 104. The motor rotor 105b is disposed so as to face the motor stator 105a. As shown in FIG. 4, the motor stator 105a has windings connected to a motor drive unit 12. The motor drive unit 12 supplies electric power having a desired frequency to the windings of the motor stator 105a according to command signals outputted from a rotation command device 11 to thereby rotate the rotatable shaft 104 at a desired rotational speed. Thus, the circulating fan 103 can be rotated within the laser container 101. The gas laser apparatus 100 has a rotation sensor 13 for detecting rotation of a disk 104a fixedly attached to an end of the rotatable shaft 104, which is an opposite end to the motor 105. Thus, the rotation sensor 13 detects an actual rotational speed of the rotatable shaft 104.

As shown in FIG. 3, the rotatable shaft 104 of the circulating fan 103 is rotatably supported in a non-contact manner at both ends of the rotatable shaft 104 by a radial magnetic bearing apparatus 107 provided in the cylindrical portion 101a of the laser container 101 and a radial magnetic bearing apparatus 106 and an axial magnetic bearing apparatus 108 provided in the cylindrical portion 101b of the laser container 101. Thus, the gas laser apparatus 100 can achieve stable high-speed rotation of the circulating fan 103 with less rotational resistance. Accordingly, a laser gas can be circulated so as to generate a high-power laser beam. Within the laser container 101, the laser gas is circulated through spaces formed in the magnetic bearing apparatuses 106, 107, and 108.

The radial magnetic bearing apparatus 106 includes a displacement sensor 106a and an electromagnet 106b, which are provided on an inner surface of the stationary cylindrical portion 101b of the laser container 101. The electromagnet 106b has a coil for levitating the rotatable shaft 104 by a magnetic force. The radial magnetic bearing apparatus 106 also includes a displacement sensor target 106c and an electromagnet target 106d made of a magnetic material, which are provided on an outer surface of the rotatable shaft 104 so as to face the displacement sensor 106a and the electromagnet 106b, respectively. The radial magnetic bearing apparatus 107 has a displacement sensor 107a and an electromagnet 107b, which are provided on an inner surface of the stationary cylindrical portion 101a of the laser container 101. The radial magnetic bearing apparatus 107 also includes a displacement sensor target 107c and an electromagnet target 107d made of a magnetic material, which are provided on an outer surface of the rotatable shaft 104 so as to face the displacement sensor 107a and the electromagnet 107b, respectively. The radial magnetic bearing apparatuses 106 and 107 detect a relative position of the rotatable shaft 104 by the displacement sensors 106a and 107a and adjust exciting currents to the electromagnets 106b and 107b based on the relative position so as to levitate and support the rotatable shaft 104 in a non-contact manner at a desired position in a radial direction.

Similarly, the axial magnetic bearing apparatus 108 includes a displacement sensor 106a and a pair of electromagnets 108b and 108b, which are provided in the stationary cylindrical portion 101b of the laser container 101. The axial magnetic bearing apparatus 108 also includes a displacement sensor target 108c and an electromagnet target 108d made of a magnetic material, which are provided on the rotatable shaft 104. The displacement sensor 108a detects a relative position of the displacement sensor target 108c to detect an axial position of the rotatable shaft 104. The pair of electromagnets 108b and 108b, which interpose the target 108d on the rotatable shaft 104 therebetween, control a magnetic force so as to support the rotatable shaft 104 in a non-contact manner at a desired position in an axial direction.

The same control is performed to support the rotatable shaft 104 in a non-contact manner at both sides of the rotatable shaft 104 in a radial direction by the radial bearing apparatuses 106 and 107 and in an axial direction by the axial bearing apparatus 108. The control of the radial magnetic bearing apparatus 107 will be described by way of example.

As shown in FIG. 4, the radial magnetic bearing apparatus 107 has a control device 19 for a magnetic bearing. The control device 19 has a displacement detector 15 for detecting a radial position of the rotatable shaft 104 based on a signal from the displacement sensor 107a, which detects the displacement sensor target 107c, and outputting a positional detection signal S1, a subtracter 30 for calculating a deviation from a reference position (desired levitation position) R of the rotatable shaft 104 based on the positional detection signal S1, a phase compensator 16 for calculating and outputting a bearing control signal S2 to compensate the deviation so as to optimally operate the magnetic bearing, and a driver 17 for amplifying the bearing control signal S2 and supply an exciting current to the electromagnet 107b.

With the control device 19, when the rotatable shaft 104 is stationarily levitated, a magnetic force is fed back from the electromagnet 107b to the magnetic target 107d based on a relative position of the rotatable shaft 104 so as to stably position and support the rotatable shaft 104 at a desired position in a non-contact manner.

The control device 19 also has a control adjuster 29 for the magnetic bearing. The control adjuster 29 includes a rotational speed detector 20 for detecting the rotational speed (rotation frequency) of the rotatable shaft 104 based on a signal from the rotation sensor 13, which faces the disk 104a of the rotatable shaft 104, and outputting a pulse signal S3, a frequency-voltage converter (F/V converter) 21 for converting the rotation frequency pulse signal S3 into a voltage signal S4 and outputting the voltage signal S4, and a band-pass filter (BPF) 22 for filtering the bearing control signal S2 inputted from the phase compensator 16. The rotation frequency corresponding to the voltage signal S4 is set as a center frequency of the band-pass filter 22. The control adjuster 29 also includes an amplifier 23 for amplifying the bearing control signal S5 outputted from the band-pass filter 22 at a predetermined amplification ratio, a control switch 24 for switching on and off transmission of an amplified bearing control signal S6, and an adder 25 for adding the amplified bearing control signal S6 to the bearing control signal S2, which is to be transmitted from the phase compensator 16 to the driver 17.

The control device 19 also has a switch controller 26 for switching on and off the switch 24 based on the voltage signal S4 outputted from the F/V converter 21. The switch controller 26 switches on the switch 24 when the rotational speed of the rotatable shaft 104 is within a predetermined rotational speed range. The switch controller 26 switches off the switch 24 when the rotational speed of the rotatable shaft 104 is not within the predetermined rotational speed range. For example, a rotational speed range near a critical speed in a rigid mode of the rotatable shaft 104, in which the stiffness of the radial magnetic bearing 107 is lowered by an unbalanced radial magnetic pull of the driven motor 105, can be used as a predetermined rotational speed range described above.

With the control adjuster 29, the bearing control signal S2, which is to be transmitted between the phase compensator 16 and the driver 17 in a main circuit, is amplified at a predetermined amplification ratio according to the actual rotation frequency of the rotatable shaft 104. An adjustment signal (amplified bearing control signal) S6, which is adjusted to have a gain sufficient to support the rotatable shaft 104, is added to a basic bearing control signal S2. Thus, even under such conditions that the stiffness of the radial magnetic bearing 107 is lowered by an unbalanced radial magnetic pull applied to the rotatable shaft 104 when the motor 105 generates a driving force, the control adjuster 29 can adjust a gain for levitation control near the rotation frequency of the rotatable shaft 104 so as to achieve sufficient magnetic bearing stiffness. Thus, it is possible to prevent the rotatable shaft 104 from whirling due to unbalanced forces. Accordingly, the control adjuster 29 can stably support (levitate) the rotatable shaft 104 in a non-contact manner and achieve stable rotation of the rotatable shaft 104 of the circulating fan 103 within the laser container 101.

The amplifier 23 can calculate (estimate) a gain sufficient to support the rotatable shaft 104 and adjust an amplification ratio to a proper value based on the actual rotation frequency of the rotatable shaft 104, a frequency of a power source (not shown) of the motor drive unit 12, a voltage of the power source, a current of the power source, or a command signal of the rotation command device 11. The frequency, voltage, and current of the power source, and the command signal of the rotation command device 11 correspond to the rotation frequency of the rotatable shaft 104.

Further, in order to prevent an open-loop gain of the magnetic bearing from being lowered by an unbalanced radial magnetic pull and maintain a constant open-loop gain when the rotatable shaft 104 is stationarily levitated, the amplifier 23 may continuously adjust an amplification ratio to Kum/Ku where Kum is an unbalanced radial magnetic pull of the motor 105 which is applied to the rotatable shaft 104 and Ku is an unbalanced force produced according to the principles of a magnetic bearing.

FIGS. 5A and 5B are graphs showing frequency transfer characteristics of the magnetic bearing apparatus shown in FIG. 4. FIG. 5A shows gain characteristics, and FIG. 5B shows phase characteristics. FIGS. 5A and 5B show frequency transfer characteristics before and after the adder 25, i.e. frequency transfer characteristics between the output signal S2 of the phase compensator 16 and the output signal S7 of the adder 25. As shown in FIG. 5A, the control adjuster 29 can increase a gain for levitation control only near the actual rotation frequency of the rotatable shaft 104. With the control adjuster 29, as shown in FIG. 5B, a phase lag is produced at frequencies higher than the actual rotation frequency. Accordingly, the bandwidth of the band-pass filter 22 is properly reduced to prevent the instability of the magnetic bearing of the radial magnetic bearing apparatus 107.

FIG. 6 is a time chart showing an example of operation of the control device 19. As shown in FIG. 6, the switch controller 26 switches on the switch 24 at the time t1 when the voltage signal S4, which corresponds to the actual rotation frequency (rotational speed) of the rotatable shaft 104, reaches a level v1 corresponding to a frequency slightly lower than a critical speed (frequency) CS1 in a rigid mode of the rotatable shaft 104. Then, the switch controller 26 switches off the switch 24 at the time t2 when the voltage signal S4 reaches a level v2 corresponding to a frequency slightly higher than the critical speed CS1 in the rigid mode of the rotatable shaft 104. Thus, the switch 24 can be switched on during a period of time during which the voltage signal S4 is within a range of from the level v1 to the level v2.

Figure 7:
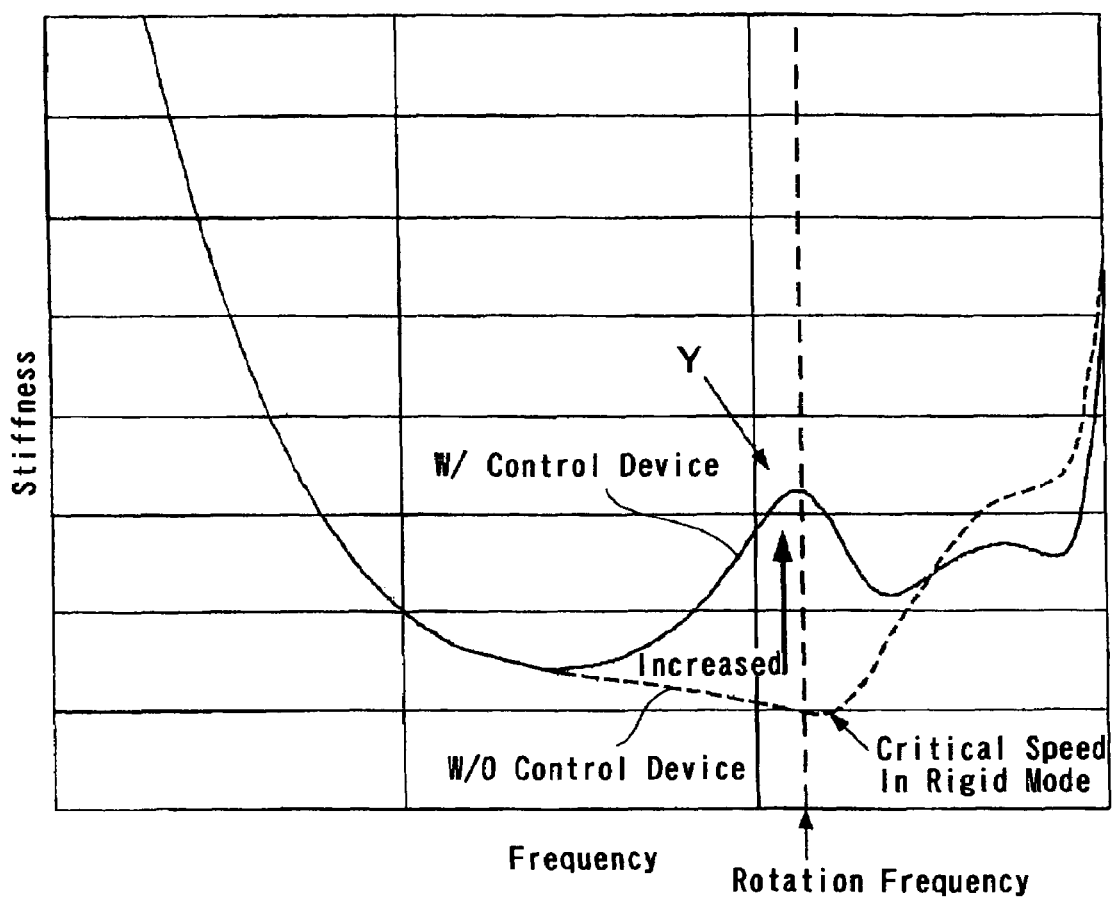
FIG. 7 is a graph showing characteristics of magnetic bearing stiffness of the magnetic bearing apparatus shown in FIG. 4.

FIG. 7 shows the magnetic bearing stiffness with the control adjuster 29 and the magnetic bearing stiffness without the control adjuster 29. As shown in FIG. 7, a gain is increased near the critical speed CS1 in the rigid mode of the rotatable shaft 104. Specifically, the control adjuster 29 switches on the control switch 24 to maintain high stiffness of the radial magnetic bearing apparatus 107 when the rotation frequency of the rotatable shaft 104 is near the frequency corresponding to the critical speed CS1 in the rigid mode (see Y in FIG. 7). Without the control adjuster 29, the rotatable shaft 104 would whirl due to an unbalanced radial magnetic pull. However, with the control adjuster 29 as described above, it is possible to prevent the rotatable shaft 104 from whirling and to stably support the rotatable shaft 104 in a non-contact manner. Further, the control adjuster 29 amplifies a gain for levitation control only near the frequency corresponding to the critical speed CS1 in the rigid mode of the rotatable shaft 104. Accordingly, the control stability is not inhibited at higher-order frequencies in a flexible mode of the rotatable shaft 104.

The center frequency of the band-pass filter 22 is not limited to the actual rotation frequency of the rotatable shaft 104. For example, the center frequency of the band-pass filter 22 may be set by converting a frequency of the power source of the motor drive unit 12, a voltage of the power source, a current of the power source, or a command signal of the rotation command device 11 into the rotation frequency of the rotatable shaft 104. In the present embodiment, an on-off control of the switch controller 26 is based on the actual rotation frequency of the rotatable shaft 104. However, a frequency of the power source of the motor drive unit 12, a voltage of the power source, a current of the power source, or a command signal of the rotation command device 11 may be converted into the rotation frequency of the rotatable shaft 104, and the converted rotation frequency may be used for an on-off control of the switch controller 26.

As described above, according to the present embodiment, the center frequency of the band-pass filter 22 corresponds to (or correlates with) the rotation frequency of the rotatable shaft 104. Accordingly, the bearing control signal to be inputted into the driver 17 can be amplified as needed so as to adjust a gain for levitation control of the magnetic bearing. Thus, it is possible to optimize an open-loop gain to support the rotatable shaft 104 in a non-contact manner in the laser container 101. The gain for levitation control of the magnetic bearing can be optimally adjusted only near the frequency corresponding to the critical speed in the rigid mode of the rotatable shaft 104 by adjusting an amplification ratio according to the rotation frequency of the rotatable shaft 104, or by switching this adjustment of the amplification ratio. Thus, the control stability can be enhanced.

Therefore, at frequencies at which an open-loop gain is lowered because an unbalanced radial magnetic pull caused by the motor 105 is applied to the magnetic bearing of the rotatable shaft 104, the gain for levitation control of the magnetic bearing can be adjusted to a desired value required to suppress unbalanced vibration of the rotatable shaft 104 according to the rotation frequency. The gain for levitation control of the magnetic bearing is increased only in a frequency range in which the adjustment is required, e.g. at the critical speed in the rigid mode at which the rotatable shaft 104 is not rotated about the center of inertia. Thus, adjustment of the gain can be minimized. While the gain for levitation control is not increased at higher-order frequencies in the flexible mode, it is possible to prevent the stability of the control system of the magnetic bearing from being inhibited for reasons other than rotation of the rotatable shaft 104.

As a result, even if an unbalanced radial magnetic pull is produced by rotation of the rotatable shaft 104, the stiffness of the magnetic bearing can effectively be maintained so as to stably rotate the circulating fan 103 of the gas laser apparatus 100 at a high speed to generate a high-power laser beam.

FIG. 8 is a block diagram showing a control system of a magnetic bearing apparatus according to a second embodiment of the present invention. Like components in the present embodiment are designated by the same reference numerals as those in the first embodiment and will not be described below repetitively.

In the present embodiment, radial magnetic bearing apparatuses 206 and 207 have displacement sensors 206a and 207a, electromagnets 206b and 207b, displacement sensor targets 206c and 207c, and electromagnet targets 206d and 207d made of a magnetic material, respectively, as with the radial magnetic bearings 106 and 107 in the first embodiment. An axial magnetic bearing apparatus 208 has a displacement sensor 208a, a pair of electromagnets 208b, a displacement sensor target 208c, and an electromagnet target 208d made of a magnetic material. The levitation control of the magnetic bearing apparatuses 206, 207, and 208 is performed in the same manner. The control of the radial magnetic bearing apparatus 207 will be described by way of example.

As shown in FIG. 8, the radial magnetic bearing 207 has a control device 119, which includes a displacement detector 115 for detecting a radial position of the rotatable shaft 104 based on a signal from the displacement sensor 207a, which detects the displacement sensor target 207c, and outputting a positional detection signal S11, a subtracter 130 for calculating a deviation from a reference position (desired levitation position) R of the rotatable shaft 104 based on the positional detection signal S11, a phase compensator 116 for calculating and outputting a bearing control signal S12 to compensate the deviation so as to optimally operate the magnetic bearing, and a driver 117 for amplifying the bearing control signal S12 and supply an exciting current to the electromagnet 207b.

The control device 119 also has a control adjuster 129 for a magnetic bearing. The control adjuster 129 includes a rotational speed detector 120 for detecting the rotational speed (rotation frequency) of the rotatable shaft 104 based on a signal from the rotation sensor 13, which faces the disk 104a of the rotatable shaft 104, and outputting a pulse signal S13, a frequency-voltage converter (F/V converter) 121 for converting the rotation frequency pulse signal S13 into a voltage signal S14 and outputting the voltage signal S14, and a band-pass filter (BPF) 122 for filtering the bearing control signal S112 inputted from the phase compensator 116. The rotation frequency corresponding to the voltage signal S14 is set as a center frequency of the band-pass filter 122, which is the center of the frequency band to be passed. The control adjuster 129 also includes an amplification ratio adjuster 123 for outputting a signal S15 determined depending upon the voltage signal S14 from the FN converter 121, a multiplier 128 for multiplying the output signal S16 from the band-pass filter 122 and the output signal S15 from the amplification ratio adjuster 123 together and outputting a signal S17, a control switch 124 for switching on and off transmission of the multiplied bearing control signal S17, and an adder 125 for adding the multiplied bearing control signal S17 to the bearing control signal S12, which is to be transmitted from the phase compensator 116 to the driver 117.

The adder 125 serves as an adder when the output signal S15 from the amplification ratio adjuster 123 is positive and serves as a subtracter when the output signal S15 from the amplification ratio adjuster 123 is negative. Thus, the adder 125 serves as an adder-subtracter. Further, an amplification ratio of the output signal S16 from the band-pass filter 122 can be determined by adjusting the magnitude of the output signal S15. Thus, adjustment of the sign and the magnitude of the output signal S15 from the amplification ratio adjuster 123 can determine an arithmetic process to be performed on the signal S16 from the band-pass filter 122, including addition, subtraction, amplification, and attenuation. Thus, the amplification ratio adjuster 123 and the multiplier 128 form a first amplifier for amplifying the output signal S16 of the band-pass filter 122 at a desired amplification ratio.

Figure 9A:
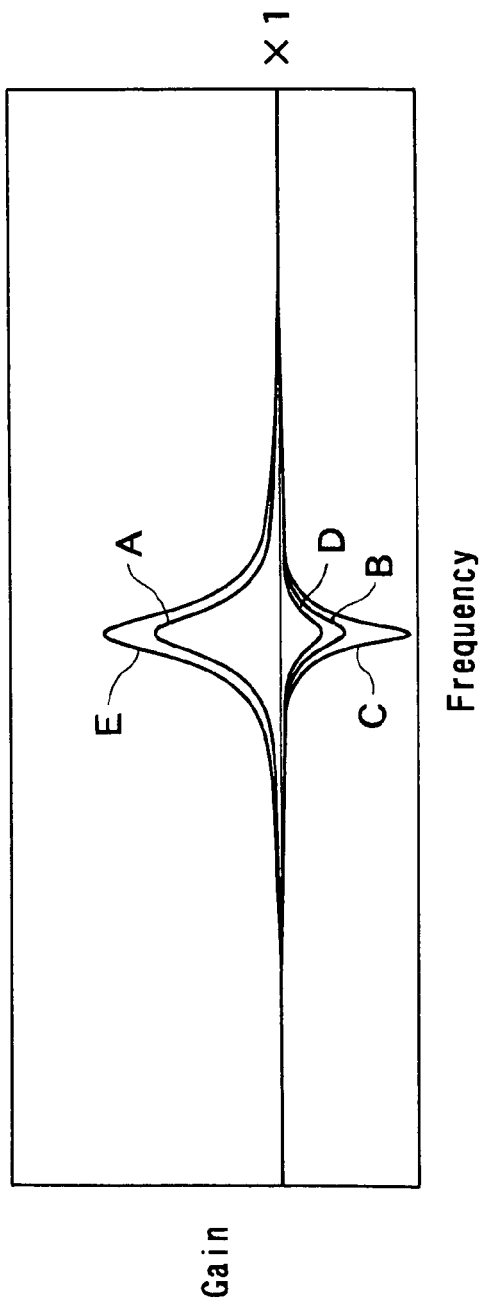
FIGS. 9A and 9B are graphs showing frequency transfer characteristics of the magnetic bearing apparatus shown in FIG. 8.
Figure 9B:
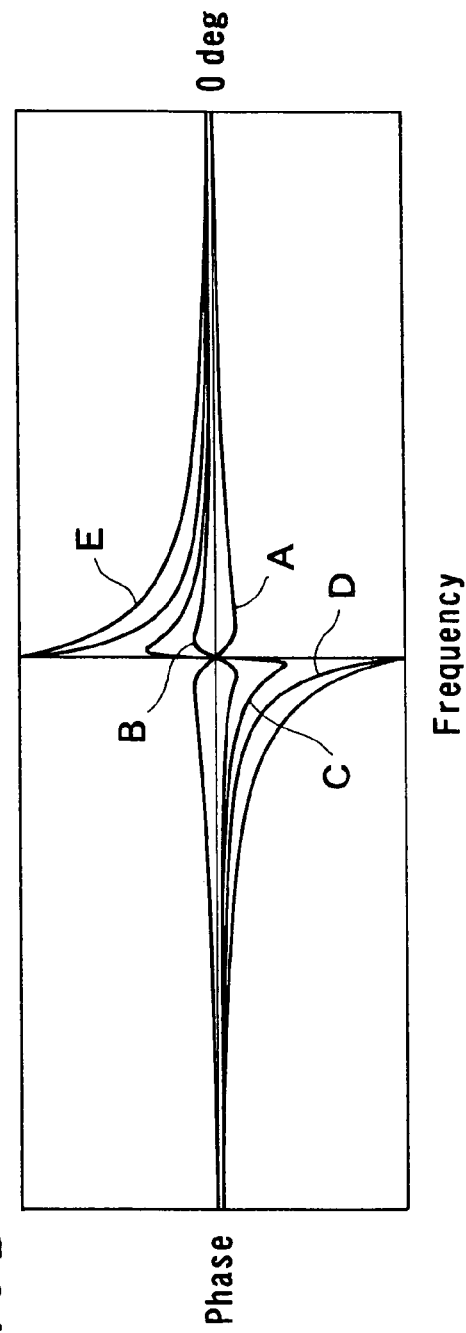

FIGS. 9A and 9B are graphs showing frequency transfer characteristics of the magnetic bearing apparatus shown in FIG. 8. FIG. 9A shows gain characteristics, and FIG. 9B shows phase characteristics. FIGS. 9A and 9B show frequency transfer characteristics before and after the adder 125, i.e. frequency transfer characteristics between the output signal S12 of the phase compensator 116 and the output signal S18 of the adder 125. In FIGS. 9A and 9B, curves A indicate a case where the output signal S15 of the amplification ratio adjuster 123 is a positive value larger than zero. Curves B indicate a case where the output signal S15 is smaller than zero and larger than −1, and curves C indicate a case where the output signal S15 is equal to −1, i.e. a case of a notch filter. Curves D indicate a case where the output signal S15 is smaller than −1 and larger than −2, and curves E indicate a case where the output signal S15 is smaller than −2. In a case where the output signal S15 is equal to zero, which is not shown, the signal S12 is directly outputted as the signal S18. When the output signal S15 is equal to −2, characteristics of an all-pass filter, which has a phase lag of 360°, are obtained.

Thus, various kinds of characteristics can be achieved by adjusting the output signal S15. Accordingly, characteristics can optimally be selected according to characteristics of a rotatable member to be levitated by a magnetic force, thereby preventing the instability of the magnetic bearing.

The control adjuster 129 also has a feedforward circuit 130 for adding a feedforward signal to the output signal S18 of the adder 125 when the amplification ratio of the amplification ratio adjuster 123 is large. The feedforward circuit 130 includes an oscillator 131 for generating a signal S19 having a desired frequency, a frequency-phase tuner 132 for conforming the frequency and phase of the output signal S19 of the oscillator 131 to the frequency and phase of the output signal S18 of the adder 125, a (second) amplifier 133 for amplifying the output signal S19 of the oscillator 131 at a predetermined amplification ratio, a control switch 134 for switching on and off transmission of the amplified signal S20, and an adder 135 for adding the amplified signal S20 to the output signal S18 of the adder 125.

By increasing a gain of the frequency transfer characteristics from the signal S12 to the signal S18, such a feedforward circuit 130 can achieve high magnetic bearing stiffness in a frequency range in which an open-loop gain for the magnetic bearing control system is increased to a certain extent.

The control device 119 also has a switch controller 126 for switching on and off the switch 124 and the switch 134. The switch controller 26 switches on and off the switch 124 and the switch 134 independently of each other based on the voltage signal S14 outputted from the F/V converter 121 when the rotational speed of the rotatable shaft 104 is within a predetermined rotational speed range.

FIG. 10 is a time chart showing an example of operation of the control device 119. As shown in FIG. 10, the switch controller 126 switches on the switch 124 at the time t1 when the voltage signal S14, which corresponds to an actual rotation frequency (rotational speed) of the rotatable shaft 104, reaches a level v1 corresponding to a frequency slightly lower than a critical speed (frequency) CS1 in a rigid mode of the rotatable shaft 104. Then, the switch controller 126 switches off the switch 124 at the time t2 when the voltage signal S14 reaches a level v2 corresponding to a frequency slightly higher than the critical speed CS1 in the rigid mode of the rotatable shaft 104.

The switch controller 126 switches on the switch 124 at the time t3 when the voltage signal S14 reaches a level v3 corresponding to a frequency slightly lower than a critical speed (frequency) CS2 in a flexible mode of the rotatable shaft 104. Then, the switch controller 126 switches on the switch 134 at the time t4 when the voltage signal S14 reaches a level v4 corresponding to a frequency slightly higher than the critical speed CS2 in the flexible mode of the rotatable shaft 104 so as to close the feedforward circuit 130. The switch controller 126 switches off the switch 124 and the switch 134 at the time t5 when the voltage signal S14 reaches a level v5 corresponding to a frequency higher than the critical speed CS2 in the flexible mode of the rotatable shaft 104.

With such operation of the control device 119, even if the rotational speed of the rotatable member (rotatable shaft 104) reaches a critical speed in a rigid mode and a critical speed in a flexible mode, high bearing stiffness can be maintained so as to suppress unbalanced vibration of the rotatable shaft 104. When the control device 119 is configured to enhance the bearing stiffness at a critical speed in a flexible mode of the rotatable shaft 104, it is desirable that the bandwidth of the band-pass filter 122 should be narrow in order not to have an influence on frequency properties near the critical speed of the band-pass filter 122 to make the rotatable shaft 104 unstable.

When the control switch 134 is switched off, the center frequency of the band-pass filter 122 may be set to be any frequency other than the rotation frequency of the rotatable shaft 104. For example, as the rotational speed of the rotatable shaft 104 is increased, a critical speed is diverged into a forward whirl frequency and a backward whirl frequency. If the magnetic bearing becomes unstable at the forward whirl frequency, the center frequency of the band-pass filter 122 may be set to be near the forward whirl frequency to stabilize the magnetic bearing. In this case, the control device 119 may be configured to lower a gain like a notch filter. The center frequency of the band-pass filter 122 may be set so as to follow fluctuations of a forward whirl frequency and a backward whirl frequency of critical speeds, which are caused by variations of the rotation frequency of the rotatable shaft 104.

The center frequency of the band-pass filter 122 is not limited to the actual rotation frequency of the rotatable shaft 104. For example, the center frequency of the band-pass filter 122 may be set by converting a frequency of a power source of the motor drive unit 12, a voltage of the power source, a current of the power source, or a command signal of the rotation command device 11 into the rotation frequency of the rotatable shaft 104. In the present embodiment, an on-off control of the switch controller 126 is based on the actual rotation frequency of the rotatable shaft 104. However, a frequency of a power source of the motor drive unit 12, a voltage of the power source, a current of the power source, or a command signal of the rotation command device 11 may be converted into the rotation frequency of the rotatable shaft 104, and the converted rotation frequency may be used for on-off controls of the switch controller 126 and the switch controller 134.

An amplification ratio of the amplification ratio adjuster 123 is not limited to the actual rotation frequency of the rotatable shaft 104. For example, an amplification ratio of the amplification ratio adjuster 123 may be set by converting a frequency of a power source of the motor drive unit 12, a voltage of the power source, a current of the power source, or a command signal of the rotation command device 11 into the rotation frequency of the rotatable shaft 104. Further, since a path from the signal S12 to the signal S18 is connected to the phase compensator 116 in series, the configuration from the signal S12 to the signal S18 may be connected to an input port of the phase compensator 116.

Figure 11:
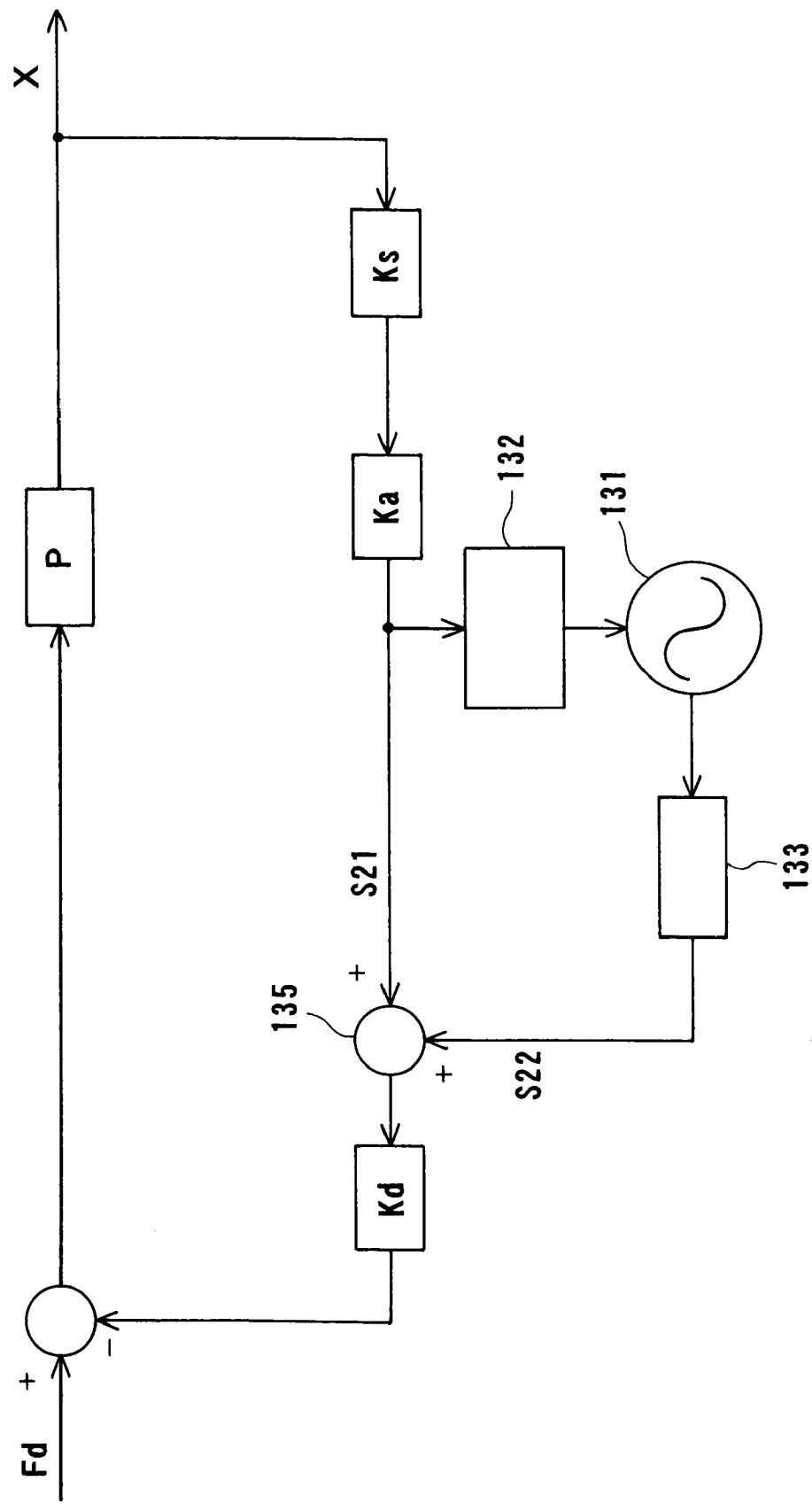
FIG. 11 is a block diagram showing the magnetic bearing apparatus shown in FIG. 8.

FIG. 11 is a block diagram from a disturbance Fd to the rotatable shaft 104 in the control device 119 shown in FIG. 8 to a displacement X of the rotatable shaft 104. In FIG. 11, P is a response characteristic of the rotatable shaft 104, Ks a response characteristic of the displacement detector 115, Ka a response characteristic of a portion of the control device 119 including the phase compensator 116, the band-pass filter 122, the amplification ratio adjuster 123, and the adder 125, and Kd a response characteristic of the driver 117.

When the signal S22 is not added to the signal S21, a closed-loop characteristic from the disturbance Fd to the displacement X of the rotatable shaft 104 is expressed by the following equation (1).

$$\frac{X}{Fd} = \frac{P \cdot e^{j\phi}}{1 + P \cdot Ks \cdot Ka \cdot Kd \cdot e^{j(\phi+\theta)}} \quad (1)$$

The center frequency of the band-pass filter 122 is defined as a frequency f When an amplification ratio of the amplification ratio adjuster 123 is increased, the gain of Ka can be increased at the frequency f. If the amplification ratio of Ka is large to a certain extent, the equation (1) is considered as being equivalent to the following equation (2).

$$\frac{X}{Fd} \approx \frac{1}{Ks \cdot Ka \cdot Kd} e^{j(-\theta)} \quad (2)$$

From the equation (2), a phase difference between the displacement X and the disturbance Fd is substantially $-\theta$. It is assumed that the driver 117 (Kd) sufficiently responds and have no phase lag. The equation (2) means that the disturbance Fd has substantially the same phase as the signal S21. When the frequency f is the rotation frequency of the rotatable shaft 104, the disturbance Fd substantially corresponds to an unbalanced force applied to the rotatable shaft 104. Thus, the signal S21 has substantially the same frequency and the same phase as the unbalanced force Fd.

The frequency and the phase of the oscillator 131, which can generate a signal having a desired frequency, are set so as to be the same as the signal S21. The signal S22 properly amplified is added to the signal S21. A signal having an opposite phase to the unbalanced force Fd can be fed forward. Specifically, the unbalanced force Fd can be cancelled by the signal S22. Thus, unbalanced vibration of the displacement X can effectively be suppressed.

When the signal S22 is not added to the signal S21, the magnetic bearing stiffness can be improved by increasing an amplification ratio of the first amplifier (i.e., the amplification ratio adjuster 123 and the multiplier 128). However, since an amplification ratio is finite, the improvement of the magnetic bearing stiffness has a limitation. According to the present embodiment, since the oscillator 131 can perform a feed forward control, it is possible to maintain high magnetic bearing stiffness without limitation of an amplification ratio of the first amplifier.

In the above embodiments, the present invention is applied to the circulating fan 103 in the gas laser apparatus 100. However, the present invention is also applicable to a rotatable member in a fluid machine having a rotation mechanism, such as a pump, a compressor, or a fan. Further, the present invention is also applicable to a rotating machine having a rotatable member supported by a magnetic bearing apparatus and actuated by a motor.

Although certain preferred embodiments of the present invention have been shown and described in detail, it should be understood that various changes and modifications may be made therein without departing from the scope of the appended claims.

What is claimed is:

1. A magnetic bearing apparatus comprising:
an electromagnet having a coil for levitating a rotatable member by a magnetic force; and
a control device configured to adjust a gain for levitation control of the rotatable member, said control device including:
  a displacement sensor operable to detect a levitated position of the rotatable member;
  a driver operable to supply a current to said electromagnet;
  a phase compensator operable to adjust the current to be supplied to said electromagnet based on a signal from said displacement sensor;
  a band-pass filter into which an output signal of said phase compensator is inputted;
  an amplifier operable to amplify an output signal of said band-pass filter at a predetermined amplification ratio; and an adder operable to add an output signal of said amplifier to an output signal of said phase compensator and supply an added signal to said driver, wherein said band-pass filter has a center frequency based on at least one of an actual rotation frequency of the rotatable member, a voltage, a current, and a frequency of a power source to supply electric power to a motor for rotating the rotatable member.

2. The magnetic bearing apparatus as recited in claim 1, wherein said control device is operable to adjust an amplification ratio of said amplifier based on at least one of the actual rotation frequency of the rotatable member, the voltage, the current, and the frequency of the power source.

3. The magnetic bearing apparatus as recited in claim 1, wherein said control device further includes a switch operable to switch adjustment of the gain for levitation control of the rotatable member based on at least one of the actual rotation frequency of the rotatable member, the voltage, the current, and the frequency of the power source.

4. The magnetic bearing apparatus as recited in claim 3, wherein said control device further includes a switch controller operable to switch on said switch based on at least one of the actual rotation frequency of the rotatable member, the voltage, the current, and the frequency of the power source when the rotation frequency of the rotatable member is within a range near a frequency corresponding to a critical speed of the rotatable member.

5. A magnetic bearing apparatus comprising:
   an electromagnet having a coil for levitating a rotatable member by a magnetic force; and
   a control device configured to adjust a gain for levitation control of the rotatable member, said control device including:
      a displacement sensor operable to detect a levitated position of the rotatable member;
      a driver operable to supply a current to said electromagnet;
      a phase compensator operable to adjust the current to be supplied to said electromagnet based on a signal from said displacement sensor;
      a band-pass filter into which an output signal of said phase compensator is inputted;
      a first amplifier operable to amplify an output signal of said band-pass filter at a predetermined amplification ratio;
      an adder-subtracter operable to add an output signal of said first amplifier to an output signal of said phase compensator or subtract an output signal of said first amplifier from an output signal of said phase compensator; and
      a feedforward circuit operable to add a feedforward signal to an output signal of said adder-subtracter and supply an added signal to said driver when the amplification ratio of said first amplifier is large.

6. The magnetic bearing apparatus as recited in claim 5, wherein said control device is operable to adjust an amplification ratio of said first amplifier based on at least one of an actual rotation frequency of the rotatable member, a voltage, a current, and a frequency of a power source to supply electric power to a motor for rotating the rotatable member.

7. The magnetic bearing apparatus as recited in claim 5, wherein said control device further includes a first switch operable to switch adjustment of the gain for levitation control based on at least one of an actual rotation frequency of the rotatable member, a voltage, a current, and a frequency of a power source to supply electric power to a motor for rotating the rotatable member.

8. The magnetic bearing apparatus as recited in claim 7, wherein said control device further includes a switch controller operable to switch on said first switch based on at least one of the actual rotation frequency of the rotatable member, the voltage, the current, and the frequency of the power source when the rotation frequency of the rotatable member is within a range near a frequency corresponding to a critical speed of the rotatable member.

9. The magnetic bearing apparatus as recited in claim 5, wherein said feedforward circuit includes:
   an oscillator operable to generate a signal having a desired frequency;
   a tuner operable to conform a frequency and a phase of an output signal of said oscillator to a frequency and a phase of the output signal of said adder-subtracter; and
   a second amplifier operable to amplify an output signal of said oscillator at a predetermined amplification ratio.

10. The magnetic bearing apparatus as recited in claim 9, wherein said feedforward circuit is operable to adjust an amplification ratio of said second amplifier based on at least one of an actual rotation frequency of the rotatable member, a voltage, a current, and a frequency of a power source to supply electric power to a motor for rotating the rotatable member.

11. The magnetic bearing apparatus as recited in claim 9, wherein said feedforward circuit further includes a second switch operable to switch adjustment of the gain for levitation control in said feedforward circuit based on at least one of an actual rotation frequency of the rotatable member, a voltage, a current, and a frequency of a power source to supply electric power to a motor for rotating the rotatable member.

12. The magnetic bearing apparatus as recited in claim 11, wherein said control device further includes a switch controller operable to switch on said second switch based on at least one of the actual rotation frequency of the rotatable member, the voltage, the current, and the frequency of the power source when the rotation frequency of the rotatable member is within a range near a frequency corresponding to a critical speed of the rotatable member.

13. A fluid machine comprising:
   a rotatable member;
   a motor operable to rotate said rotatable member; and
   a magnetic bearing apparatus, said magnetic bearing apparatus comprising:
      an electromagnet having a coil for levitating said rotatable member by a magnetic force; and
      a control device configured to adjust a gain for levitation control of said rotatable member, said control device including:
         a displacement sensor operable to detect a levitated position of said rotatable member;
         a driver operable to supply a current to said electromagnet;
         a phase compensator operable to adjust the current to be supplied to said electromagnet based on a signal from said displacement sensor;
         a band-pass filter into which an output signal of said phase compensator is inputted;
         an amplifier operable to amplify an output signal of said band-pass filter at a predetermined amplification ratio; and
         an adder operable to add an output signal of said amplifier to an output signal of said phase compensator and supply an added signal to said driver, wherein said band-pass filter has a center frequency based on at least one of an actual rotation frequency of said rotatable member, a voltage, a current, and a frequency of a power source to supply electric power to said motor.

14. The fluid machine as recited in claim 13, wherein said control device is operable to adjust an amplification ratio of said amplifier based on at least one of the actual rotation frequency of said rotatable member, the voltage, the current, and the frequency of the power source.

15. The fluid machine as recited in claim 13, wherein said control device further includes a switch operable to switch adjustment of the gain for levitation control of said rotatable member based on at least one of the actual rotation frequency of said rotatable member, the voltage, the current, and the frequency of the power source.

16. The fluid machine as recited in claim 15, wherein said control device further includes a switch controller operable to switch on said switch based on at least one of the actual rotation frequency of said rotatable member, the voltage, the current, and the frequency of the power source when the rotation frequency of said rotatable member is within a range near a frequency corresponding to a critical speed of said rotatable member.

17. A fluid machine comprising:
  a rotatable member;
  a motor operable to rotate said rotatable member; and
  a magnetic bearing apparatus, said magnetic bearing apparatus comprising:
    an electromagnet having a coil for levitating said rotatable member by a magnetic force; and
    a control device configured to adjust a gain for levitation control of said rotatable member, said control device including:
      a displacement sensor operable to detect a levitated position of said rotatable member;
      a driver operable to supply a current to said electromagnet;
      a phase compensator operable to adjust the current to be supplied to said electromagnet based on a signal from said displacement sensor;
      a band-pass filter into which an output signal of said phase compensator is inputted;
      a first amplifier operable to amplify an output signal of said band-pass filter at a predetermined amplification ratio;
      an adder-subtracter operable to add an output signal of said first amplifier to an output signal of said phase compensator or subtract an output signal of said first amplifier from an output signal of said phase compensator; and
      a feedforward circuit operable to add a feedforward signal to an output signal of said adder-subtracter and supply an added signal to said driver when the amplification ratio of said first amplifier is large.

18. The fluid machine as recited in claim 17, wherein said control device is operable to adjust an amplification ratio of said first amplifier based on at least one of an actual rotation frequency of said rotatable member, a voltage, a current, and a frequency of a power source to supply electric power to said motor.

19. The fluid machine as recited in claim 17, wherein said control device further includes a first switch operable to switch adjustment of the gain for levitation control based on at least one of an actual rotation frequency of said rotatable member, a voltage, a current, and a frequency of a power source to supply electric power to said motor.

20. The fluid machine as recited in claim 19, wherein said control device further includes a switch controller operable to switch on said first switch based on at least one of the actual rotation frequency of said rotatable member, the voltage, the current, and the frequency of the power source when the rotation frequency of said rotatable member is within a range near a frequency corresponding to a critical speed of said rotatable member.

21. The fluid machine as recited in claim 17, wherein said feedforward circuit includes:
  an oscillator operable to generate a signal having a desired frequency;
  a tuner operable to conform a frequency and a phase of an output signal of said oscillator to a frequency and a phase of the output signal of said adder-subtracter; and
  a second amplifier operable to amplify an output signal of said oscillator at a predetermined amplification ratio.

22. The fluid machine as recited in claim 21, wherein said feedforward circuit is operable to adjust an amplification ratio of said second amplifier based on at least one of an actual rotation frequency of said rotatable member, a voltage, a current, and a frequency of a power source to supply electric power to said motor.

23. The fluid machine as recited in claim 21, wherein said feedforward circuit further includes a second switch operable to switch adjustment of the gain for levitation control in said feedforward circuit based on at least one of an actual rotation frequency of said rotatable member, a voltage, a current, and a frequency of a power source to supply electric power to said motor.

24. The fluid machine as recited in claim 23, wherein said control device further includes a switch controller operable to switch on said second switch based on at least one of the actual rotation frequency of said rotatable member, the voltage, the current, and the frequency of the power source when the rotation frequency of said rotatable member is within a range near a frequency corresponding to a critical speed of said rotatable member.

* * * * *